(12) United States Patent
Little et al.

(10) Patent No.: US 8,678,861 B2
(45) Date of Patent: Mar. 25, 2014

(54) CARD CONNECTOR WITH STRUCTURE FOR PREVENTING INSERTION OF INAPPROPRIATE SIZE CARDS

(75) Inventors: Terrance F. Little, York, PA (US); Hung-Yang Yeh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 447 days.

(21) Appl. No.: 13/168,931

(22) Filed: Jun. 24, 2011

(65) Prior Publication Data

US 2012/0329306 A1 Dec. 27, 2012

(51) Int. Cl.
*H01R 24/00* (2011.01)

(52) U.S. Cl.
USPC ......................................................... 439/630

(58) Field of Classification Search
USPC ......................................................... 439/630
See application file for complete search history.

(56) References Cited

U.S. PATENT DOCUMENTS

| | | | | |
|---|---|---|---|---|
| 4,780,603 A * | 10/1988 | Hamada | ........................ | 235/492 |
| 5,036,430 A * | 7/1991 | Hills | ........................ | 361/679.31 |
| 5,969,331 A * | 10/1999 | Hoolhorst et al. | ............ | 235/486 |
| 6,109,939 A * | 8/2000 | Kondo et al. | ................. | 439/140 |
| 6,242,483 B1 * | 6/2001 | McLaughlin et al. | ........ | 514/473 |
| 6,511,350 B1 * | 1/2003 | Ito et al. | ........................ | 439/680 |
| 6,540,560 B1 * | 4/2003 | Ito et al. | ........................ | 439/633 |
| 6,648,694 B2 * | 11/2003 | Takamori et al. | ............. | 439/630 |
| 6,666,724 B1 * | 12/2003 | Lwee | ............................ | 439/630 |
| 6,799,724 B2 * | 10/2004 | Shimada et al. | ............. | 235/439 |
| 6,851,959 B2 * | 2/2005 | Ooya et al. | ................... | 439/159 |
| 6,896,555 B1 * | 5/2005 | Su et al. | ........................ | 439/630 |
| 6,905,369 B2 * | 6/2005 | Nakai et al. | ................... | 439/630 |
| 6,976,879 B2 * | 12/2005 | Shishikura et al. | ........... | 439/630 |
| 7,011,549 B1 * | 3/2006 | Lai | ................................ | 439/630 |
| 7,044,798 B2 * | 5/2006 | Takei et al. | .................... | 439/630 |
| 7,083,440 B2 * | 8/2006 | Shen et al. | .................... | 439/138 |
| 7,083,473 B1 * | 8/2006 | Lai | ................................ | 439/630 |
| 7,112,095 B2 * | 9/2006 | Shen et al. | .................... | 439/630 |
| 7,214,076 B1 * | 5/2007 | Sabo | ............................ | 439/138 |
| 7,238,052 B2 * | 7/2007 | Wang et al. | ................... | 439/630 |
| 7,267,561 B2 * | 9/2007 | Lai et al. | ....................... | 439/138 |
| 7,309,259 B2 * | 12/2007 | Sun et al. | ...................... | 439/630 |
| 7,326,085 B2 * | 2/2008 | Takai et al. | ................... | 439/630 |
| 7,357,653 B2 * | 4/2008 | Hung et al. | ................... | 439/138 |
| 7,364,820 B2 * | 4/2008 | Tanaka et al. | ................. | 439/633 |
| 7,377,814 B2 * | 5/2008 | Shen et al. | .................... | 439/630 |
| 7,431,595 B1 * | 10/2008 | Yen et al. | ...................... | 439/138 |

(Continued)

*Primary Examiner* — Neil Abrams
(74) *Attorney, Agent, or Firm* — Wei Te Chung; Ming Chieh Chang

(57) ABSTRACT

A card connector includes a main housing having a base portion, a pair of side walls and a bottom wall connecting with said base portion and side walls thereby defining a receiving cavity therebetween. A multiple groups of contact sets comprise contacting portions projecting into the receiving cavity. A metallic shell covers a top side of the main housing and defines an insertion opening together with the main housing at a front end thereof. A pair of guiders are floatably assembled on the bottom wall and respectively located beside the side walls. Each guider has a spring member disposed thereunder. A pair of locking devices are located at opposite sides of the insertion opening. Each locking device has a stopping section detachably supporting the guider under so as to prevent unmated card to be inserted. If an appropriate size card is inserted it will actuate the locking devices to cause the guiders to become deflectable by that card. If an inappropriate size card is inserted it will not actuate the locking devices and the guiders will undeflectable and will block that card.

17 Claims, 7 Drawing Sheets

(56) References Cited

U.S. PATENT DOCUMENTS

| | | | |
|---|---|---|---|
| 7,448,912 B1 * | 11/2008 | Shiue et al. | 439/630 |
| 7,611,056 B2 * | 11/2009 | Sato | 235/441 |
| 7,628,624 B2 * | 12/2009 | Ye et al. | 439/137 |
| 7,867,034 B1 * | 1/2011 | Sato et al. | 439/630 |
| 7,874,857 B2 * | 1/2011 | Takei et al. | 439/218 |
| 2004/0259426 A1 * | 12/2004 | Chang | 439/677 |
| 2006/0046542 A1 * | 3/2006 | Obara et al. | 439/135 |
| 2009/0137139 A1 * | 5/2009 | Shiue et al. | 439/160 |
| 2012/0231650 A1 * | 9/2012 | Tian et al. | 439/374 |
| 2012/0329306 A1 * | 12/2012 | Little et al. | 439/367 |

\* cited by examiner

US 8,678,861 B2

CARD CONNECTOR WITH STRUCTURE FOR PREVENTING INSERTION OF INAPPROPRIATE SIZE CARDS

BACKGROUND OF THE INVENTION

1. Field of the Invention

The present invention relates to a card connector, and more particularly to an N-IN-1 card connector having a floating guider.

2. Description of the Related Art

A card connector apparatus is generally used as an expanded recording apparatus of an electronic equipment such as a personal computer or a digital camera. As a storage medium of the card connector apparatus, a PC card or a memory card has come into wide use. This PC card or memory card is installed in the card connector apparatus to write and read necessary information. In recent years, as small memory cards, such as a long one, a short one, a thick one, or a thin one, have been developed, and various kinds of card connector apparatuses adapted for receiving multiple kinds of cards have been developed. An N-IN-1 card connector is usually adapted for receiving several kinds of cards therein, accordingly, the card connector arranged several kinds of contacts for electrically contacting with the several kinds of cards. For guiding different sized cards, a pair of guiders are provided at an insertion port defined in a front end of the card insertion cavity. However, as the guiders are often supported by a pair of spring plates, if an unmated card is inserted into the insertion port and urges the guiders, the guiders will fall downwardly and allow the unmated card to be inserted and result damage the contacts. Obviously, an improved card connector is highly desired to overcome the aforementioned problem.

SUMMARY OF THE INVENTION

Accordingly, an object of the present invention is to provide a card connector for preventing unmated cards to be inserted thereinto and protecting contacts received therein.

In order to achieve the object set forth, a card connector includes a main housing having a base portion, a pair of side walls extending forwardly from opposite sides of the base portion, and a bottom wall connecting with said base portion and side walls thereby defining a receiving cavity therebetween and extending along a rear-to-front direction. A multiple groups of contact sets comprise contacting portions projecting into the receiving cavity. A metallic shell covers a top side of the main housing and defines an insertion opening together with the main housing at a front end thereof. A pair of guiders are floatably assembled on the bottom wall and respectively located beside the side walls. Each guider has a spring member disposed thereunder. A pair of locking devices are located at opposite sides of the insertion opening. Each locking device has a stopping section detachably supporting the guider under condition that the stopping portion stops the downward movement of the guider when the guider is urged by an unmated card while the stopping portion leaves the guider and allows the guider to move downward when a mated card is inserted.

Other objects, advantages and novel features of the invention will become more apparent from the following detailed description of the present embodiment when taken in conjunction with the accompanying drawings.

DETAILED DESCRIPTION OF THE INVENTION

Figure 1:
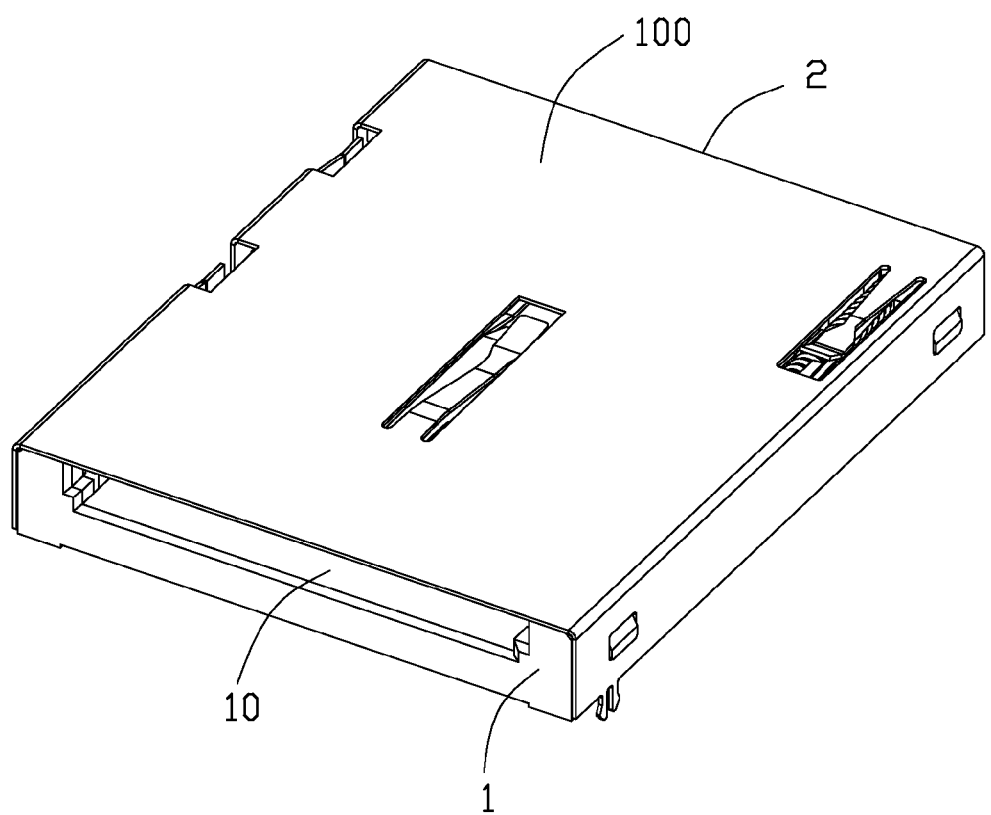
FIG. 1 is a perspective view of a card connector in accordance with the present invention.
Figure 2:
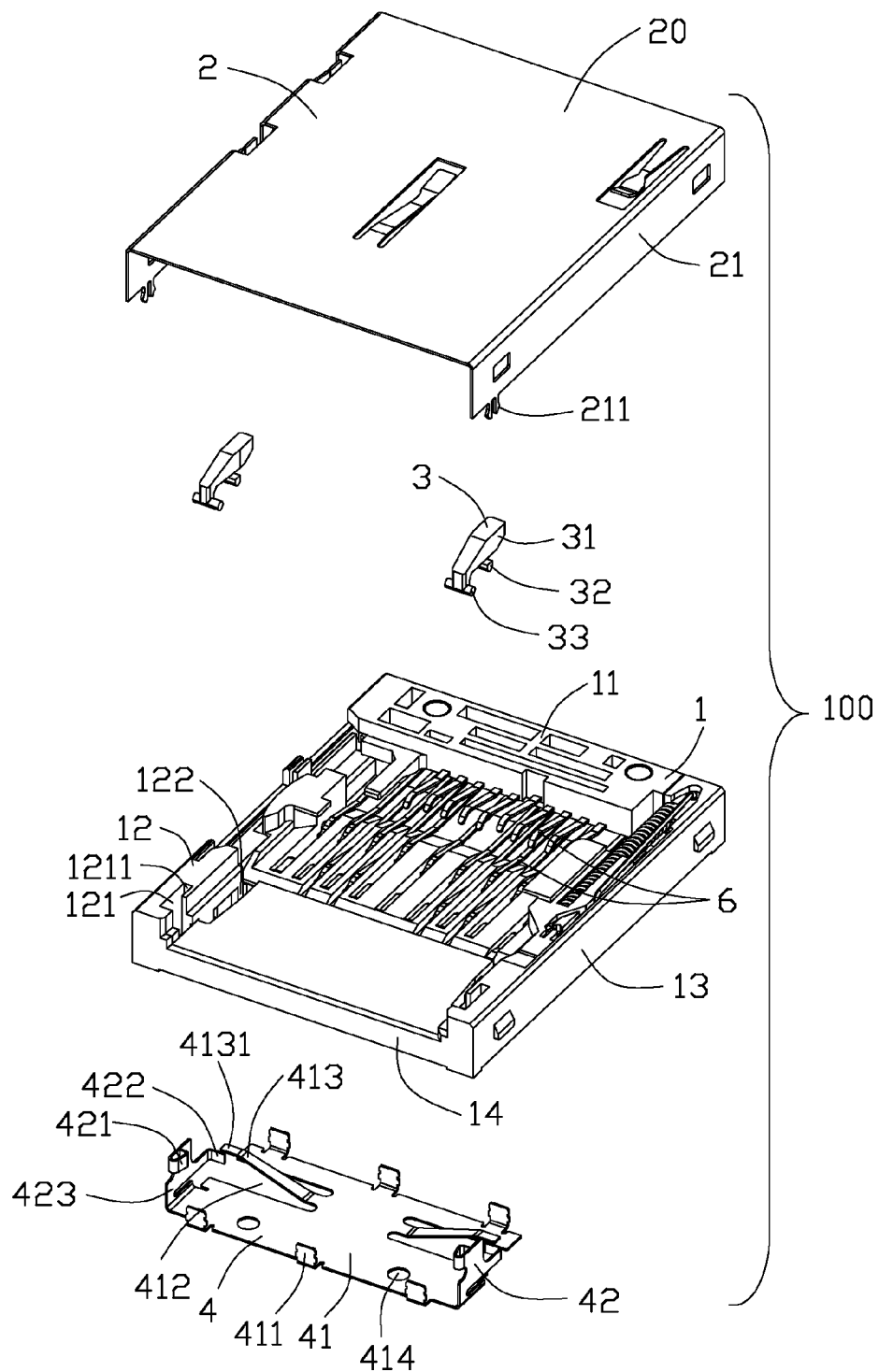
FIG. 2 is an exploded perspective view of the card connector shown in FIG. 1.

Reference will now be made to the drawing figures to describe a preferred embodiment of the present invention in detail. Referring to FIGS. 1-2, a card connector 100 made according to the preferred embodiment of the present invention is provided and comprises an insulative housing 1, a metallic shell 2, a pair of guiders 3, a plurality of contacts 6 and a metallic plate 4.

Figure 3:
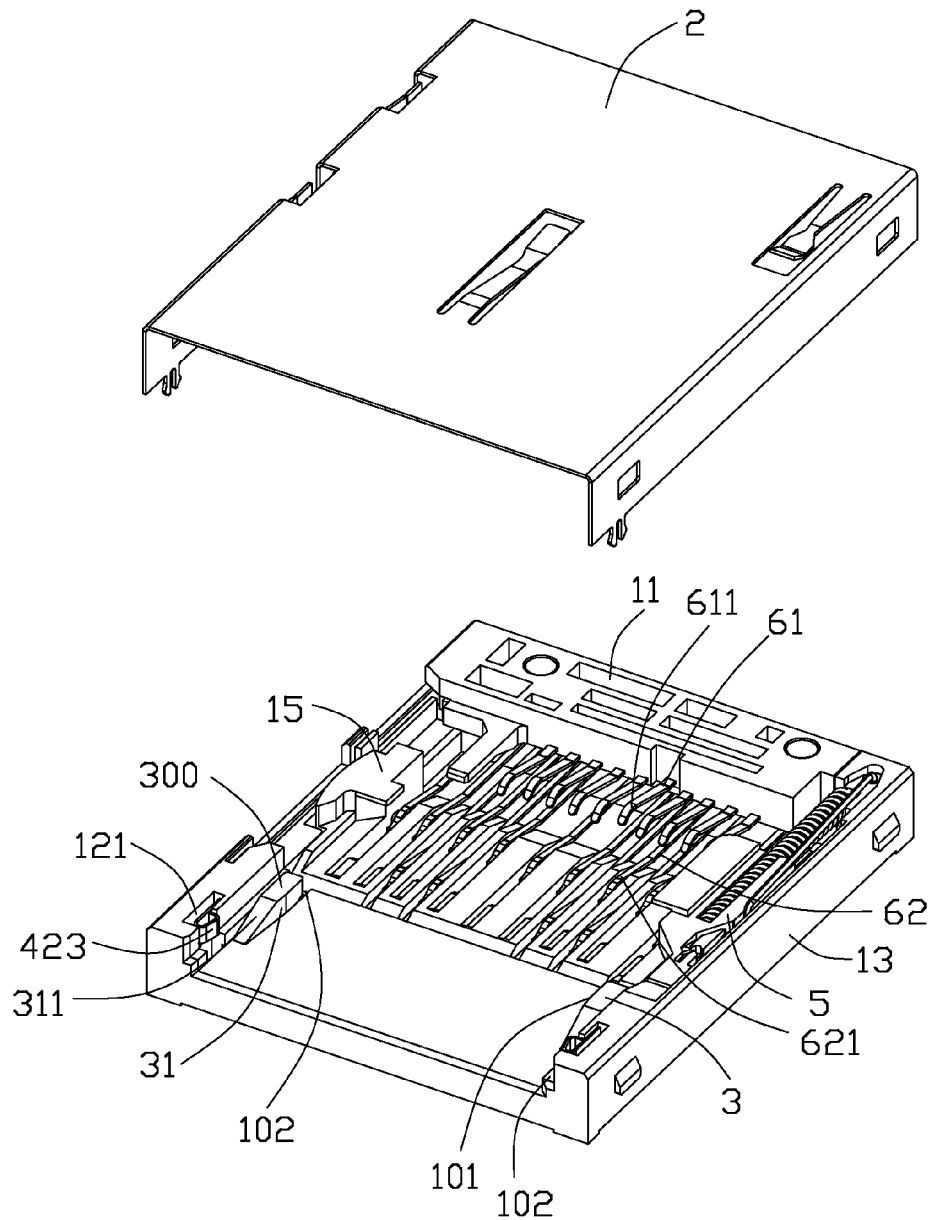
FIG. 3 is a partly exploded perspective view of the card connector shown in FIG. 1, which shows a detailed configuration inside the card connector.
Figure 4:
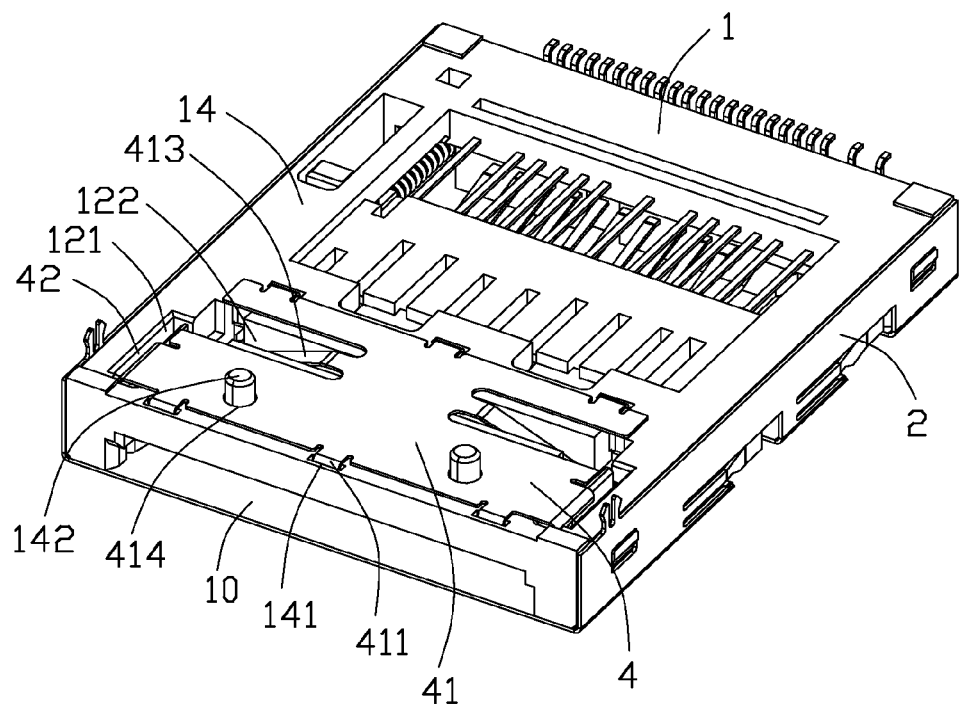
FIG. 4 is another perspective view of the card connector shown in FIG. 1, seen from a bottom side.

Referring to FIGS. 2-3, the insulative housing 1 is configured as a rectangular shape and comprises a lengthwise base portion 11, a first side wall 12 and a second side wall 13 perpendicularly extending from two opposite ends of the base portion 11, and a bottom wall 14 extending forwardly from a lower side of the base portion 11 and connecting with the first and second side walls 12, 13. The metallic shell 2 covers an upper side of the base portion 11 and defines a card receiving cavity 10 between the metallic shell 2 and the insulative housing 1. The receiving cavity 10 defines an insertion opening at a front end thereof. The contacts 6 are divided into a first contact array 61 and a second contact array 62, which are respectively fixed in the base portion 11 with first contacting sections 611 and second contacting sections 621 respectively projecting forwardly and exposed in the card receiving cavity 10. The second contacting sections 621 are closer to the insertion opening while the first contacting sections 611 are far away from the insertion opening. An ejecting mechanism 5 is assembled on the second side wall 13 and cooperates with the first contact array 61 for mating with a first card. A sliding plate 15 is assembled on the bottom wall 14 and cooperates with the second contact array 62 for mating with a second card. The second card is wider than the first card in a transverse direction, but thinner than the first card in a vertical direction perpendicular to the transverse direction.

A pair of first receiving slots 121 are respectively defined on the first and second side walls 12, 13 and run through the bottom wall 14 along the vertical direction. The first receiving slots 121 are adjacent to the insertion opening and communicate with the card receiving cavity 10 via gaps 1211 formed on an inner lateral side of the first and second side walls 12, 13. A pair of second receiving slots 122 are respectively defined on opposite transverse sides of the bottom wall 14 and adjacent to the first and second side walls 12, 13. The second receiving slots 122 are used for receiving the pair of guiders and located behind the first receiving slots 122 along a front-to-rear direction perpendicular to the vertical direction.

Referring to FIGS. 2-3, the pair of guiders 3 are made by insulative material and each comprises an elongated body portion 31, a first rib 32 and a second rib 33 respectively formed at a bottom side of the body portion 31. The body portion 31 defines a horizontal supporting face 310 and a slant guiding face 311 extending from the supporting face 310. The guiders 3 are inserted into the second receiving slots 122 from a bottom side of the bottom wall 14, and the body portions 31 protrude into the card receiving cavity 10 to define a first card receiving space 101 therebetween. A second card receiving space 102 is also defined between the first and second side walls 12, 13 for receiving the second card.

Referring to FIG. 2, the metallic shell 2 comprises a top cover 20 and a pair of skirts 21 extending downwardly from the top cover 20 and attached to the first and second side walls 12, 13 respectively. Further, a pair of board locks 211 are respectively formed on a lower edge of the skirts 21 for mounting onto a printed circuit board, on which the card connector 100 is seated.

Referring to FIG. 2, the metallic plate 4 comprises a rectangular plate shaped body portion 41 and a pair of locking devices 42 perpendicularly extending upwardly from opposite sides of the body portion 41. A plurality of retaining portions 411 extending upwardly from a front edge and a rear edge of the body portion 41. A pair of openings 412 are defined on the body portion 41 in a symmetrical manner, in which a pair of spring plates 413 respectively protruding upwardly and slantwisely. Each spring plate 413 forms a horizontal supporting plate 4131 at a distal end. Further, a pair of holes 414 are defined on the body portion 41. Each locking device 42 comprises a base section 421 connecting with the body portion 41 and extending perpendicularly to the body portion 41, a stopping section 422 extending rearward from a rear edge of the base section 421 and bend inwardly, and an engaging section 423 extending from a front edge of the base section 421 and bend inwardly and rearwardly. In other embodiment, the locking devices 42 can be separated from the body portion 41.

Referring to FIGS. 2-5, the metallic plate 4 is attached to the bottom side of the bottom wall 14 with the retaining portions 411 secured in slots 141 defined in the bottom wall 14 and posts 142 formed on the bottom wall 14 received in the holes 414. The pair of locking devices 42 are inserted into the first receiving slots 121 with the pair of engaging sections 423 projecting into the card receiving cavity 10 via the gaps 1211 and the pair of stopping sections 422 projecting into the second receiving slots 122. The body portion 31 of the guider 3 stands on the stopping sections 422 for preventing dropping downwardly. Further, the spring plates 413 project into the second receiving slots 122 with supporting plates 4131 detachably abutting against the body portions 31 of the guiders 3.

Figure 5:
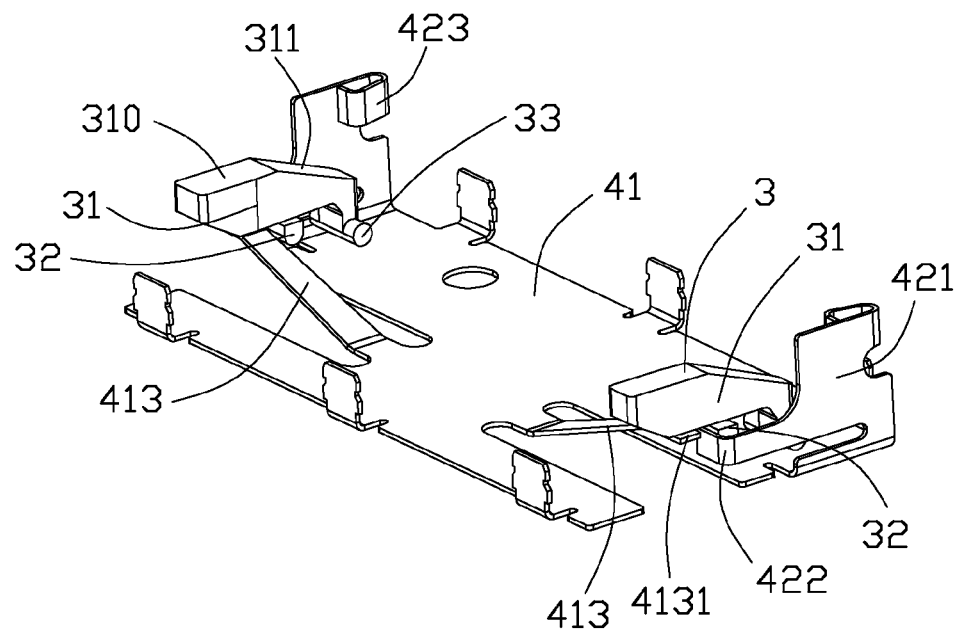
FIG. 5 is a perspective view of a metallic plate cooperating with a pair of guiders.
Figure 6:
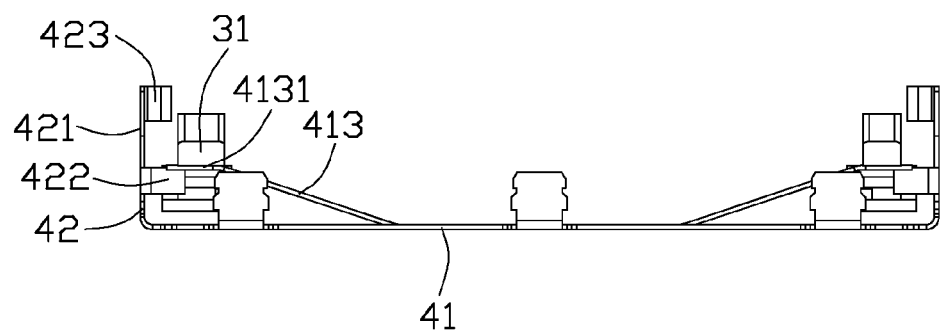
FIG. 6 is a front view of FIG. 5, which shows a stopping section of the metallic plate abutting against each guider when an engaging section of the metallic plate is not engaged.
Figure 7:
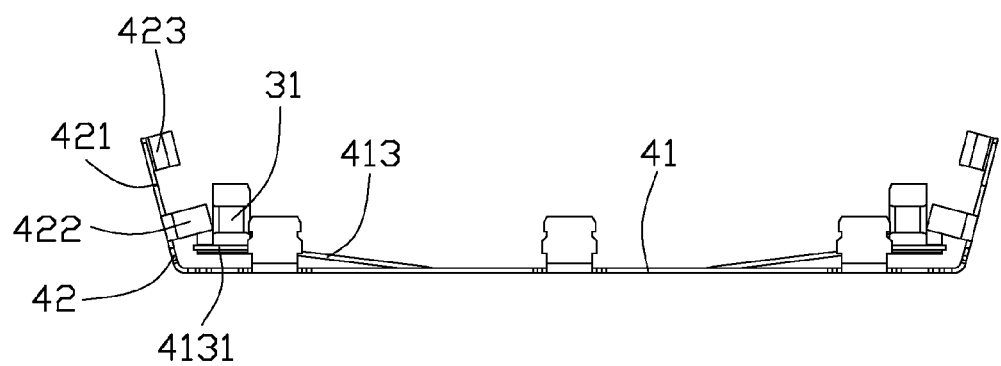
FIG. 7 is a front view of FIG. 5, which shows the stopping section of the metallic plate releasing from the guider and a corresponding spring plate formed on the metallic plate deflectably supporting the guider when the engaging section is engaged with a mating card.

Referring to FIGS. 5-7, which show how the metallic plate 4 is cooperating with the pair of guiders 3. As described above, the first card receiving space 101 is defined between the pair of guiders 3 and the second card receiving space 102 is defined between the first and second side walls 12, 13. When the first card is inserted, as the width of the first card is narrower than that between the first and second side walls 11, 13 (width of the second receiving cavity), the engaging sections 423 can not be fully engaged with the first card and the stopping sections 422 will stay at the initial positions and keep the guiders 3 immovable. When the second card is inserted, as the width of the second card is nearly equal to that between the first and second side walls 11, 13 (width of the second receiving cavity), the second card fully engages with the engaging sections 423. Meanwhile, the engaging sections 423 move outwardly so as to drive the stopping sections 422 moving outwardly and leaving from the body portions 31 of the guiders 3, the body portion 31 of the guiders 3 will then fall on the supporting plate 4131 of the spring plates 413. The second card moves inwardly further by climbing the guiding face 311 and reaching to the supporting face 310 and urges the guiders 3 to move downwardly. When the second card is withdrawn, the spring plates 413 will recover the flexibilities and push the guiders 3 to move upwardly until the stopping sections 422 stand below the body portions 31 of the guiders 3 and abut against the first ribs 32.

If an unmated card is inserted into the card receiving cavity 10 and urges the guiders 3, as the unmated card can not fully engage with the engaging sections 423 of the locking devices 42, the stopping devices 422 of the locking devices 42 will constantly support the guiders 3, and the unmated card can no longer move inwardly, which can prevent damage of the contacts 6. That is to say, the locking devices 42 can not only support the guiders 3, but also prevent the unmated card to be inserted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector comprising:
    a main housing having a base portion, a pair of side walls extending forwardly from opposite sides of the base portion, and a bottom wall connecting with said base portion and side walls thereby defining a receiving cavity therebetween and extending along a rear-to-front direction;
    multiple groups of contact sets, comprising contacting portions projecting into the receiving cavity;
    a metallic shell covering a top side of the main housing and defining an insertion opening together with the main housing at a front end thereof;
    a pair of guiders floatably assembled on the bottom wall and respectively located beside the side walls, and each guider having a spring member disposed thereunder; and
    a pair of locking devices located at opposite sides of the insertion opening;
    wherein each locking device has a stopping section moveably supporting the guider under condition that the stopping portion stops the downward movement of the guider when the guider is urged by an unmated card while the stopping portion leaves the guider and allows the guider to move downward when a mated card is inserted.

2. The card connector as described in claim 1, wherein the locking devices are received in receiving slots defined on the side walls and located at lateral sides of the guiders.

3. The card connector as described in claim 2, wherein each locking device has an engaging section protruding into the insertion opening for detecting inserted cards under condition that when the mated card is inserted the engaging section will move laterally so as to drive the stopping section leaving the guider.

4. The card connector as described in claim 3, wherein said engaging section is in front of the stopping section along the rear-to-front direction.

5. The card connector as described in claim 1, wherein the spring member and the locking device are commonly formed on a metallic plate.

6. The card connector as described in claim 5, wherein the guiders fall on the spring members when the stopping sections release from the guiders.

7. The card connector as described in claim 6, wherein the metallic plate is attached to a bottom side of the bottom wall.

8. The card connector as described in claim 7, wherein the metallic shell forms a pair of board locks at lateral sides of the insertion opening.

9. A card connector comprising:
a main housing having a base portion, a pair of side walls extending forwardly from opposite sides of the base portion, and a bottom wall connecting with said base portion and side walls thereby defining a receiving cavity therebetween and extending along a rear-to-front direction;
multiple groups of contact sets, comprising contacting portions projecting into the receiving cavity;
a metallic shell covering a top side of the main housing and defining an insertion opening together with the main housing at a front end thereof;
a pair of guiders floatably assembled on the bottom wall and each guider having a spring member disposed thereunder so as to push the guider to move upwardly or downwardly along a vertical direction perpendicular to the rear-to-front direction; and
a pair of locking devices located at opposite sides of the insertion opening, and each having a stopping section located under the guider;
wherein the stopping section moves along a transverse direction perpendicular to said rear-to-front direction and vertical direction so as to allow the guider to move along the vertical direction.

10. The card connector as described in claim 9, wherein the locking devices are respectively received in the side walls, each locking device has an engaging section disposed at a lateral side of the insertion opening and in front of said stopping section.

11. The card connector as described in claim 10, wherein the locking device and the spring members are commonly formed on a same metallic plate.

12. The card connector as described in claim 11, wherein the metallic plate is attached to a bottom side of the bottom wall.

13. A card connector comprising:
an insulative housing defining a card receiving space for receiving different type cards;
plural groups of contacts disposed in the housing for mating with narrower and wider type cards;
a pair of guiders mounted to the housing and moveable in a vertical direction between first and second positions;
a pair of locking devices mounted to the housing and respectively located in front of the pair of guiders, each of said locking devices including a stopping section actuated by the wider type card to be moved in a transverse direction perpendicular to said vertical direction for releasing the corresponding guider and allowing the guider to move in the vertical direction from the first position to the second position so as to have the wider type card inserted into the card receiving space.

14. The card connector as claimed in claim 13, further including a pair of springs to constantly urge the guiders to the first position.

15. The card connector as claimed in claim 14, wherein the guider is pivotally moveable relative to the housing.

16. The card connector as claimed in claim 13, wherein the stopping section is deflected to move in the transverse direction.

17. The card connector as claimed in claim 16, further including a pair of springs to constantly urge the guiders to the first position, and said springs and the locking devices are commonly formed on a same metallic shell.

\* \* \* \* \*